(12) United States Patent
Sridharan

(10) Patent No.: US 7,350,147 B2
(45) Date of Patent: Mar. 25, 2008

(54) SYSTEM AND METHOD FOR GRAPHICALLY DISPLAYING RELATIONSHIPS AMONG SETS OF DESCRIPTORS

(75) Inventor: Sriram Sridharan, Bangalore (IN)

(73) Assignee: SAP AG, Walldorf (DE)

( * ) Notice: Subject to any disclaimer, the term of this patent is extended or adjusted under 35 U.S.C. 154(b) by 715 days.

(21) Appl. No.: 10/895,491

(22) Filed: Jul. 21, 2004

(65) Prior Publication Data

US 2006/0020885 A1    Jan. 26, 2006

(51) Int. Cl.
*G06F 17/00* (2006.01)

(52) U.S. Cl. ............... 715/712; 715/713; 715/835

(58) Field of Classification Search ............... 715/517, 715/503, 508, 509, 712–713, 853–855, 765, 715/767, 243, 217; 709/238, 218, 250
See application file for complete search history.

(56) References Cited

U.S. PATENT DOCUMENTS

| | | | | |
|---|---|---|---|---|
| 5,487,144 A | * | 1/1996 | Takahashi et al. | 715/835 |
| 5,576,946 A | * | 11/1996 | Bender et al. | 700/17 |
| 5,630,069 A | * | 5/1997 | Flores et al. | 705/7 |
| 5,745,113 A | * | 4/1998 | Jordan et al. | 715/835 |
| 6,002,396 A | * | 12/1999 | Davies | 715/763 |
| 6,223,183 B1 | * | 4/2001 | Smith et al. | 707/102 |
| 6,904,423 B1 | * | 6/2005 | Nicolaou et al. | 706/46 |
| 2002/0059264 A1 | * | 5/2002 | Fleming et al. | 707/100 |
| 2003/0172345 A1 | * | 9/2003 | Engelsberg et al. | 715/501.1 |
| 2004/0017400 A1 | * | 1/2004 | Ly et al. | 345/810 |
| 2005/0027845 A1 | * | 2/2005 | Secor et al. | 709/223 |
| 2005/0131924 A1 | * | 6/2005 | Jones | 707/100 |
| 2005/0182773 A1 | * | 8/2005 | Feinsmith | 707/100 |

* cited by examiner

*Primary Examiner*—Tadesse Hailu
(74) *Attorney, Agent, or Firm*—Mintz, Levin, Cohn, Ferris, Glovsky & Popeo, P.C.

(57) ABSTRACT

A method and system of graphically displaying relationships among a hierarchy of descriptors facilitates an easy-to-read depiction of the relationships. Descriptors are grouped into a first, second, and third set of descriptors. These three sets of descriptors are assigned places in a hierarchy. A first set of relationships is defined between the first set of descriptors and the second set of descriptors. A second set of relationships is defined between the second set of descriptors and the third set of descriptors. The first, second, and third sets of descriptors are graphically displayed as first, second, and third descriptor lists. The first and second sets of relationships are graphically displayed as first and second relationship grids. The first descriptor list is adjacent to the first relationship grid, the first relationship grid is adjacent to the second descriptor list, the second descriptor list is adjacent to the second relationship grid, and the second relationship grid is adjacent to the third descriptor list, thereby forming a contiguous figure.

20 Claims, 12 Drawing Sheets

Hierarchy n

SYSTEM AND METHOD FOR GRAPHICALLY DISPLAYING RELATIONSHIPS AMONG SETS OF DESCRIPTORS

TECHNICAL FIELD

This invention relates generally to methods and systems for graphically displaying the relationships between sets of descriptors, and specifically to assist in the management of tasks and objectives that are performed by employees.

BACKGROUND

In a traditional management structure, a manager may oversee many employees, but each employee reports to only one manager. From the employee's perspective, there is a one-to-one relationship between the employee and the manager. In this system, the employee understands that his or her manager will be assigning tasks and conducting performance reviews. Because the manager is the only person assigning tasks to an employee, the traditional management structure allows the manager to identify the relative workloads of each employee to determine who should receive the next task. The manager is also aware of the responsibilities of each of his or her employees, and is able to evaluate the employees on the basis of their performance.

Today, many companies have foregone the traditional management structure and adopted a functional responsibility management structure. Under this approach, each manager is responsible for one or more business functions. Employees may be assigned tasks that impact several business functions. Thus, employees find themselves having to satisfy more than one manager when completing a given task. In effect, the employees now have a one-to-many relationship with their managers. Further complicating the arrangement, the managers now have a much larger pool of employees reporting to them.

From an employee's perspective, it can be difficult to determine who will review the final work product. It can also be difficult to satisfy the needs of one functional manager when the needs of another conflict. From a manager's perspective, this structure presents a greater competition for resources than the traditional system. It also becomes difficult for a manager to determine the relative workloads of the employees.

It is apparent that without a means for tracking the relationships between business functions and employee tasks, the functional responsibility management structure can create a great amount of confusion for both managers and employees. This confusion results in an often significant waste of resources through, for example, meetings to determine which employee is responsible for which task, and which manager is responsible for which portion of that task.

Prior art approaches to tracking business relationships include organizational charts, Gantt charts, and Program Evaluation and Review Technique (PERT) charts. Organizational charts may effectively describe the one-to-one relationships of the traditional management structure, but they are unable to adequately represent the one-to-many relationships in a functional responsibility management structure. Similarly, Gantt and PERT charts primarily relate to the relative timing of events rather than the business relationship between the events. They also fail to adequately present a breakdown of business functions or tasks.

SUMMARY

A method consistent with the present invention includes grouping a first set of descriptors, a second set of descriptors, and a third set of descriptors; defining a hierarchy among the first, second, and third sets of descriptors; defining a first set of relationships between the first set of descriptors and the second set of descriptors; defining a second set of relationships between the second set of descriptors and the third set of descriptors; and graphically displaying the first set of descriptors on a first descriptor list, the second set of descriptors on a second descriptor list, the third set of descriptors on a third descriptor list, the first set of relationships on a first relationship grid, and the second set of relationships on a second relationship grid. The first descriptor list is adjacent to the first relationship grid, the first relationship grid is adjacent to the second descriptor list, the second descriptor list is adjacent to the second relationship grid, and the second relationship grid is adjacent to the third descriptor list thereby forming a contiguous figure.

A method consistent with the present invention includes grouping n sets of descriptors, where $n \geq 3$; defining a hierarchy among the n sets of descriptors; defining $(n-1)$ sets of relationships between pairs of the n sets of descriptors; and graphically displaying the n sets of descriptors in n descriptor lists and the $(n-1)$ sets of relationships in $(n-1)$ relationship grids. Each of the $(n-1)$ relationship grids is adjacent to two descriptor lists, so that a contiguous figure is formed.

A method consistent with the present invention includes defining a key result area descriptor as belonging to a highest hierarchy; defining a focus area descriptor as belonging to an intermediate hierarchy; defining an objective descriptor as belonging to a lowest hierarchy; assigning a first set of relationships between the key result area descriptor and the focus area descriptor; assigning a second set of relationships between the focus area descriptor and the objective descriptor; assigning responsibility for the objective descriptor to an employee; and graphically displaying the key result area descriptor on a first descriptor list, the focus area descriptor on a second descriptor list, the objective descriptor on a third descriptor list, the employees on an employee list, the first set of relationships on a first relationship grid, the second set of relationships on a second relationship grid, and the assigned responsibilities on a third relationship grid. The first descriptor list is adjacent to the first relationship grid, the first relationship grid is adjacent to the second descriptor list, the second descriptor list is adjacent to the second relationship grid, the second relationship grid is adjacent to the third descriptor list, the third descriptor list is adjacent to the third relationship grid, and the third relationship grid is adjacent to the employee list, thereby forming a contiguous figure.

A system for describing relationships among a hierarchy of descriptors consistent with present invention includes a memory; and a microprocessor coupled to the memory and programmed to: receive a first set of descriptors, a second set of descriptors, and a third set of descriptors; define a hierarchy among the first, second, and third sets of descriptors; define a first set of relationships between the first set of descriptors and the second set of descriptors; define a second set of relationships between the second set of descriptors and the third set of descriptors; and graphically display the first set of descriptors on a first descriptor list, the second set of descriptors on a second descriptor list, the third set of descriptors on a third descriptor list, the first set of relationships on a first relationship grid, and the second set of relationships on a second relationship grid. The first descriptor list is adjacent to the first relationship grid, the first relationship grid is adjacent to the second descriptor list, the second descriptor list is adjacent to the second relationship grid, and the second relationship grid is adjacent to the third descriptor list thereby forming a contiguous figure.

An article of manufacture consistent with the present invention includes instructions for causing a processor to receive a first set of descriptors, a second set of descriptors, and a third set of descriptors; define a hierarchy among the first, second, and third sets of descriptors; define a first set of relationships between the first set of descriptors and the second set of descriptors; define a second set of relationships between the second set of descriptors and the third set of descriptors; and graphically display the first set of descriptors on a first descriptor list, the second set of descriptors on a second descriptor list, the third set of descriptors on a third descriptor list, the first set of relationships on a first relationship grid, and the second set of relationships on a second relationship grid. The first descriptor list is adjacent to the first relationship grid, the first relationship grid is adjacent to the second descriptor list, the second descriptor list is adjacent to the second relationship grid, and the second relationship grid is adjacent to the third descriptor list thereby forming a contiguous figure.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

The following description refers to the accompanying drawings in which, in the absence of a contrary representation, the same numbers in different drawings represent similar elements. The implementations in the following description do not represent all implementations consistent with the claimed invention. Instead, they are merely some examples of systems and methods consistent with the invention.

Figure 1:
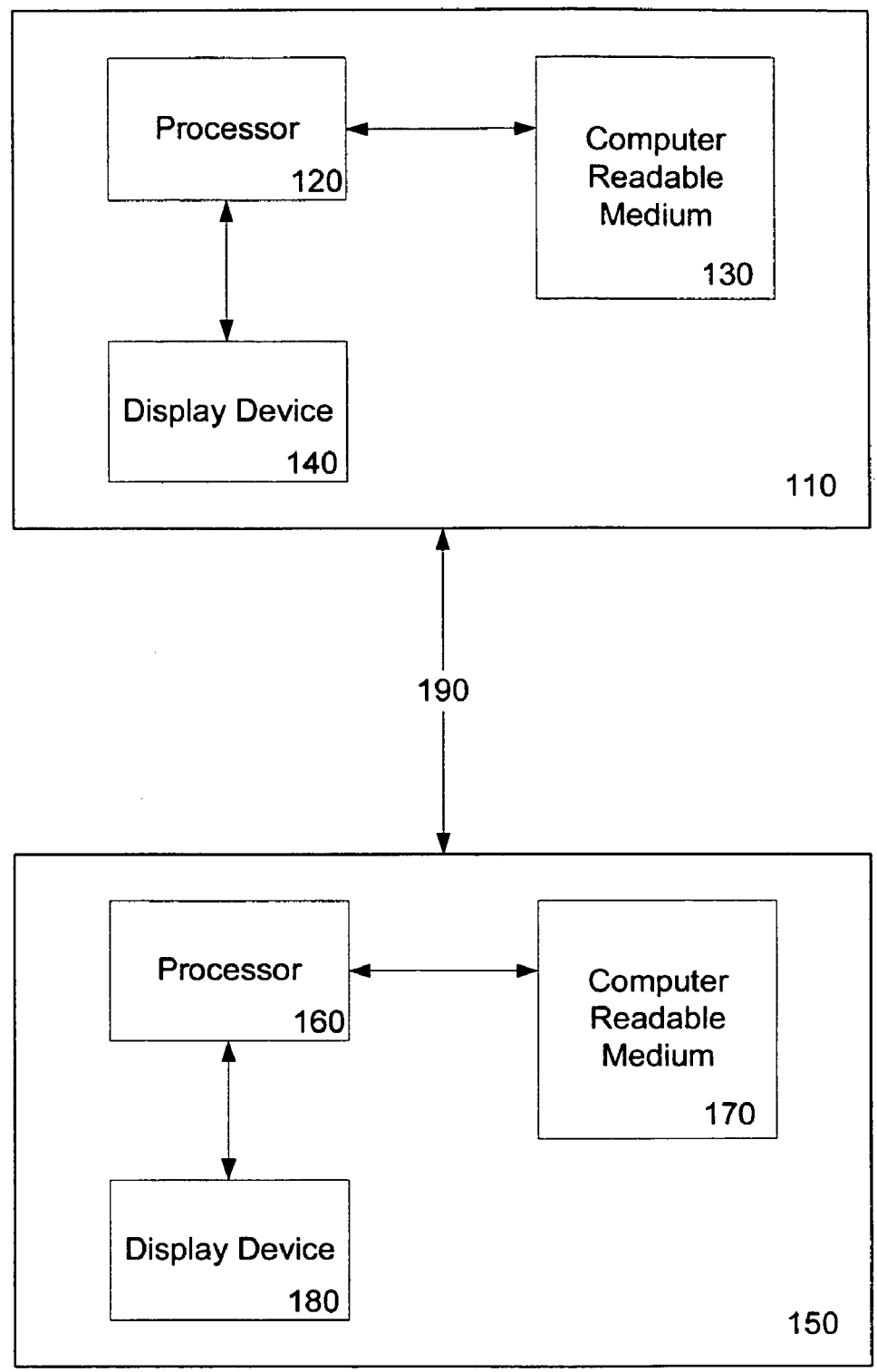
FIG. 1 is an illustration of a system for graphically displaying relationships among descriptors consistent with the present invention.

FIG. 1 is an illustration of a system for graphically displaying relationships among descriptors consistent with the present invention. In this exemplary system, computer device 110 comprises a processor 120, computer readable medium 130, and display device 140. Processor 120 accesses computer readable medium 130 to perform operations consistent with the present invention. Computer device 110 may be any type of computing platform, such as a desktop, laptop computer, notebook computer, PDA, handheld computer, or pocket computer. Computer device 110 may be a general-purpose computer running a computer program or a specially constructed computing platform for carrying-out the operations described below.

Likewise, computer device 150 comprises a processor 160, computer readable medium 170, and display device 180. Processor 160 accesses computer readable medium 170 to perform operations consistent with the present invention. Computer device 150 may be any type of computing platform, such as a desktop, laptop computer, notebook computer, PDA, handheld computer, or pocket computer. Computer device 150 may be a general-purpose computer running a computer program or a specially constructed computing platform for carrying-out the operations described below.

Furthermore, the two computer devices, 110 and 150, may be located remotely from each other so that data can be shared between them. Similarly, one computer device may contain the instructions to perform operations consistent with the invention, while the other computer device may act as a dumb terminal. In this manner, one computer device may act as a central device distributing information to another computer device.

Computer device 110 communicates with computer device 150 over an interface 190. Computer device 110, having processor 120, may transfer data objects and messages via interface 190 (which can be any conventional interface) by direct connections or other communication links. Alternatively, computer device 110 can be part of a network such as a telephone-based network (such as a PBX or POTS), a local area network (LAN), a wide area network (WAN), a dedicated intranet, and/or the Internet. In this way, computer device 110 may be located near or far from computer device 150.

Computer readable medium 130, like computer readable medium 170, may be implemented with various forms of memory or storage devices, such as read-only memory, random access memory, magnetic memory, or external devices. Typically, computer readable medium 130 stores instructions for performing operations consistent with the present invention.

Display device 140, like display device 180, may be implemented with various computer output devices such as television monitors, LCD displays, plasma displays, projectors, printers, and plotters. Display device 140, like display device 180, graphically displays a contiguous figure that represents the relationships between descriptors as discussed in more detail below.

Figure 2:
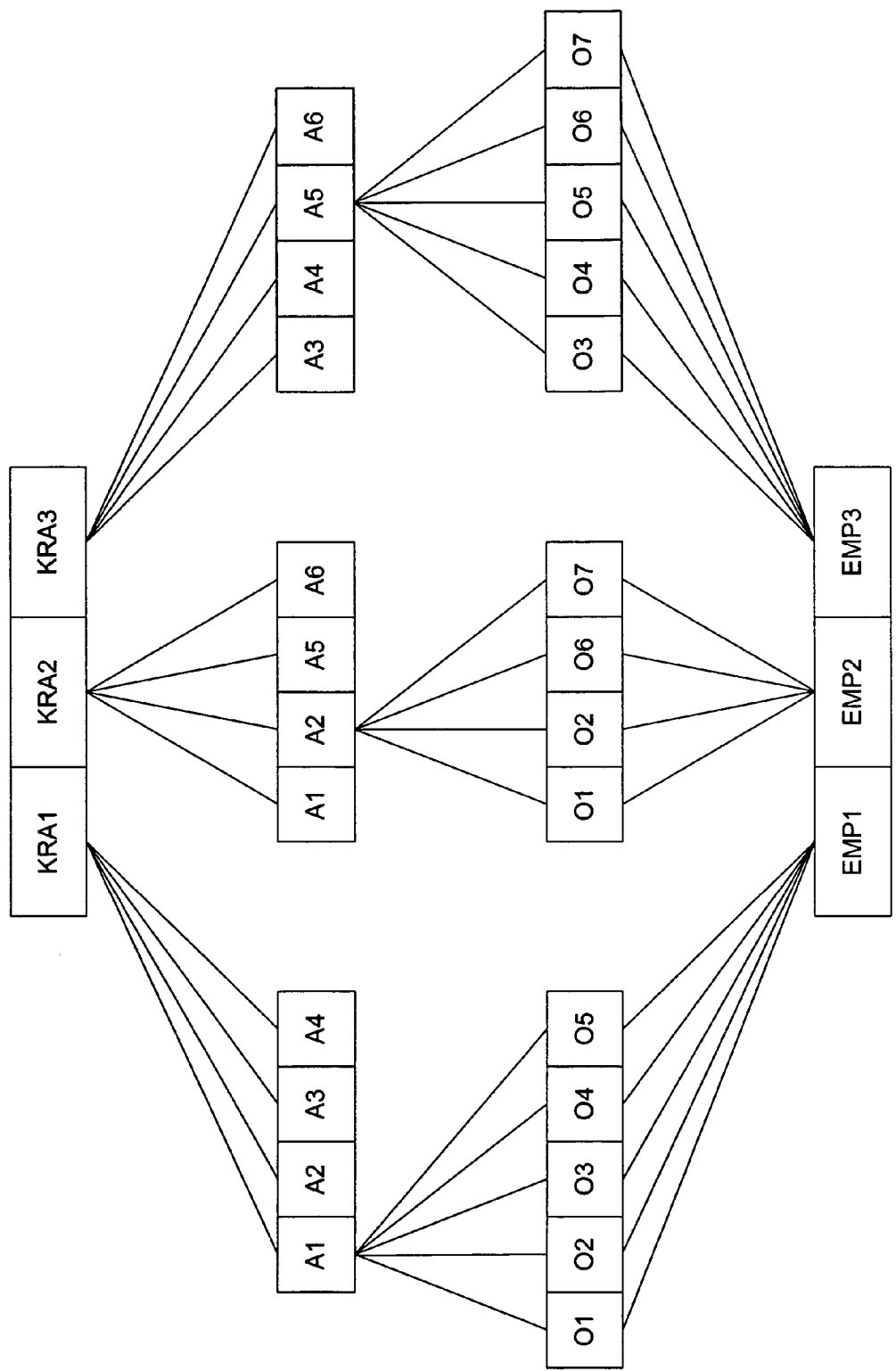
FIG. 2 is a diagram of relationships among sets of descriptors.

FIGS. 2-7 are diagrams providing more detail on the processes, which the system described above, or other systems, can carry out. FIG. 2 provides an introduction to the basic concepts of descriptors and the relationships that can be formed among descriptors. After introducing these basic concepts, the graphical display system and methods are described with more detail in FIGS. 3-7. FIGS. 3-7 elaborate on the exemplary graphical displays of the present invention. Those skilled in the art will appreciate that the graphical displays may be implemented in a variety of fashions. Although these diagrams illustrate most features of the graphical displays, they may, for purposes of clarity, omit some features in the following text.

FIG. 2 is a diagram of relationships among sets of descriptors. The descriptors are depicted by the boxes in FIG. 2, while the relationships are depicted by the lines connecting the boxes. The first set of descriptors appear at the top of FIG. 2 and are captioned KRA1, KRA2, and KRA3. These three descriptors form one descriptor group. A second group of descriptors appear on the second line of FIG. 2 and are captioned A1, A2, A3, A4, A5, and A6. A third set of descriptors appear on the third line of FIG. 2 and are captioned O1, O2, O3, O4, O5, O6, and O7. The last line of FIG. 2 contains the last group of descriptors captioned EMP1, EMP2, and EMP3. While some of the descriptors, like A1 and O2, appear twice in FIG. 2, they represent the same single descriptor.

In FIG. 2, the groups of descriptors are arranged in a hierarchy, with the highest order descriptors appearing at the top and the lowest order appearing at the bottom. In this manner, the group descriptors, KRA1, KRA2, and KRA3, are at the first level of the hierarchy. The group of descriptors, A1, A2, A3, A4, A5, and A6, are at the second level of the hierarchy. The group of descriptors, O1, O2, O3, O4, O5, O6, and O7, are at the third level of the hierarchy. The group of descriptors, EMP1, EMP2, EMP3, are at the fourth level of the hierarchy.

The relationships between the descriptors are depicted by the lines in FIG. 2. For example, KRA1 is related to A1, A2, A3, and A4. While all that is depicted is the fact that a relationship exists, this relationship may be a weighted relationship or a dependency relationship as more fully described below. Simply, a weighted relationship defines the importance or significance of the second level descriptor to the first level descriptor. For example, weights may be numbers from one to ten, with ten indicating the highest significance. If the second level descriptor A1 is an important component of the first order descriptor KRA1, then the relationship may be assigned the number ten. Other quantitative or qualitative relationships may also be assigned similar manner. Likewise, the relationship may indicate a dependence between second level descriptor A1 and first level descriptor KRA1.

In addition to defining the type of relationship between two descriptors, the lines also indicate the breakdown among descriptors. For example, the first level descriptor KRA2 breaks down into the second level descriptors A1, A2, A5, and A6. Likewise, the second level descriptor A1 breaks down into the third level descriptors O1, O2, O3, O4, and O5. In this manner, the first level descriptor KRA2 may be broken down into O1, O2, O3, O4, O5, A2, A5, and A6. In other words, a break down relationship exists among descriptors. While not described in text, numerous other relationships may be derived in a similar manner from FIG. 2.

Figure 3:
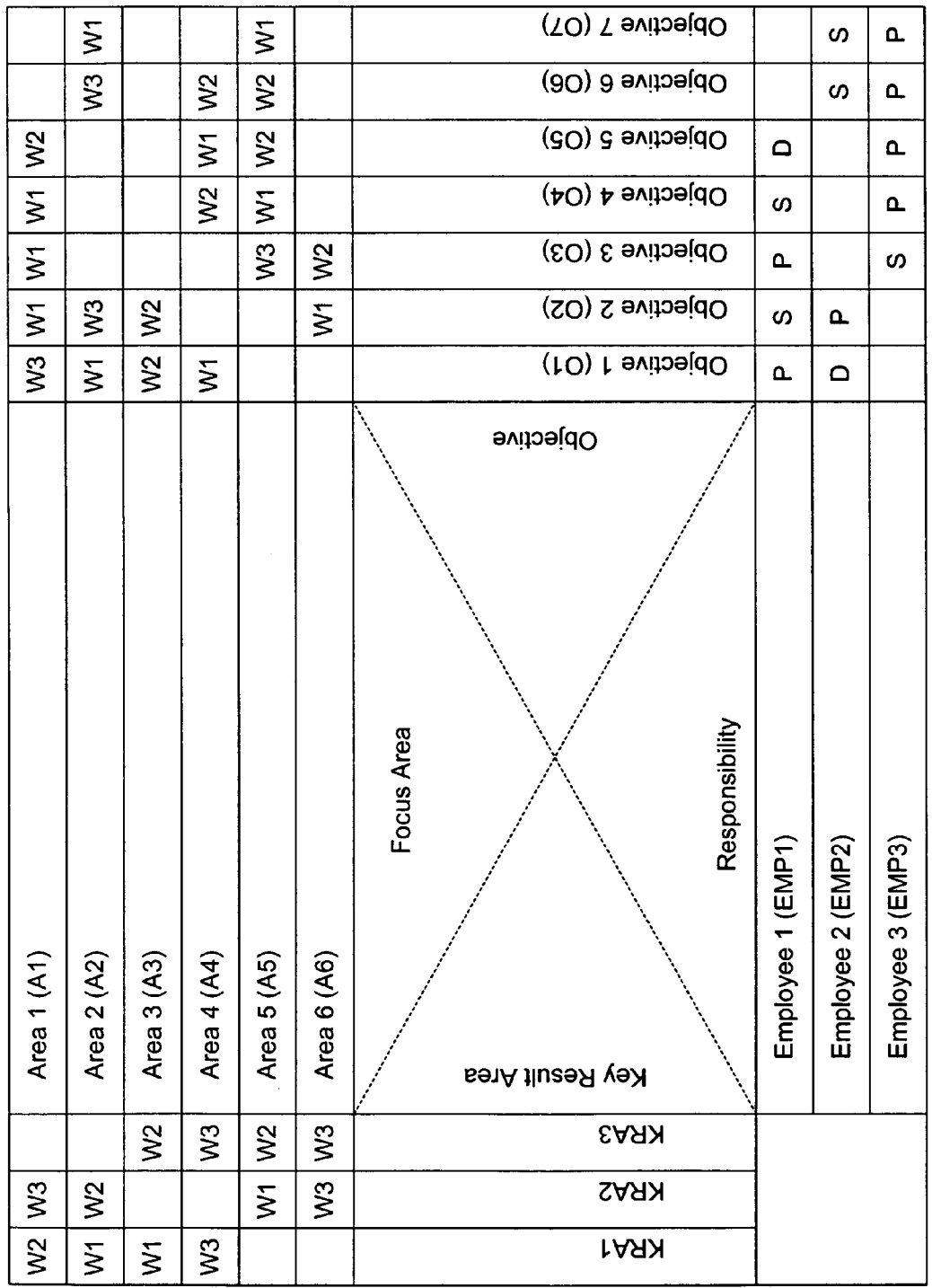
FIG. 3 is a diagram of a graphical display consistent with the invention.

With the basic concepts of descriptor groups, hierarchies, relationships, and break downs in mind, FIG. 3 is a diagram of a graphical display consistent with the invention. The diagram of FIG. 3 contains all of the information depicted in FIG. 2 plus additional relationship information. The same four groups of descriptors are depicted. In this manner, the group of descriptors, KRA1, KRA2, and KRA3, are at the first level of the hierarchy, the group of descriptors, A1, A2, A3, A4, A5, and A6, are at the second level of the hierarchy, the group of descriptors, O1, O2, O3, O4, O5, O6, and O7, are at the third level of the hierarchy, and the group of descriptors, EMP1, EMP2, EMP3, are at the fourth level of the hierarchy.

The first level descriptors (KRA1, KRA2, and KRA3), in this case, represent Key Result Areas which encompass relatively broad goals for a business. Within each Key Result Area are a number of Focus Areas (A1, A2, A3, A4, A5, and A6). Focus Areas are more specific goals. Within each Focus Area are a number of Objectives (O1, O2, O3, O4, O5, O6, and O7). Objectives are individual, task-related goals that are performed by employees (EMP1, EMP2, EMP3). Since Key Result Areas are the broadest descriptors, they are at the first level or top of the hierarchy. Focus Areas are narrower than Key Result Areas, but broader than Objectives. Therefore, they reside at the second level of the hierarchy. Objectives are narrower than Focus Areas and reside at the third level of the hierarchy. At the bottom of the hierarchy are the employees to which Objectives are assigned.

Figures 6, 7:
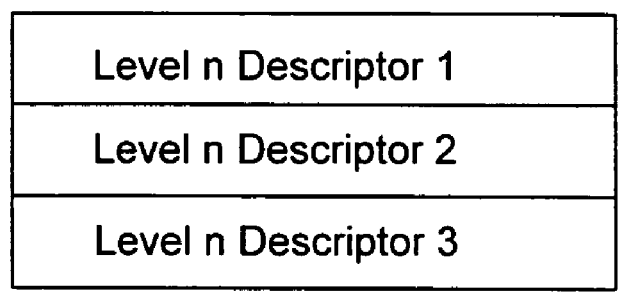
FIG. 6 is an example of a relationship grid.
FIG. 7 is an example of a descriptor list.

Each group of descriptors is displayed as a descriptor list. A descriptor list is a graphical depiction of a group of descriptors within the same hierarchy. In this case, KRA1, KRA2, and KRA3, all belonging to the first level of the hierarchy, are displayed as a first descriptor list. While shown as a rectilinear figure, a descriptor list may be depicted as other types of figures, such as a curvilinear figure. An example of a descriptor list is shown in FIG. 6.

Figure 5:
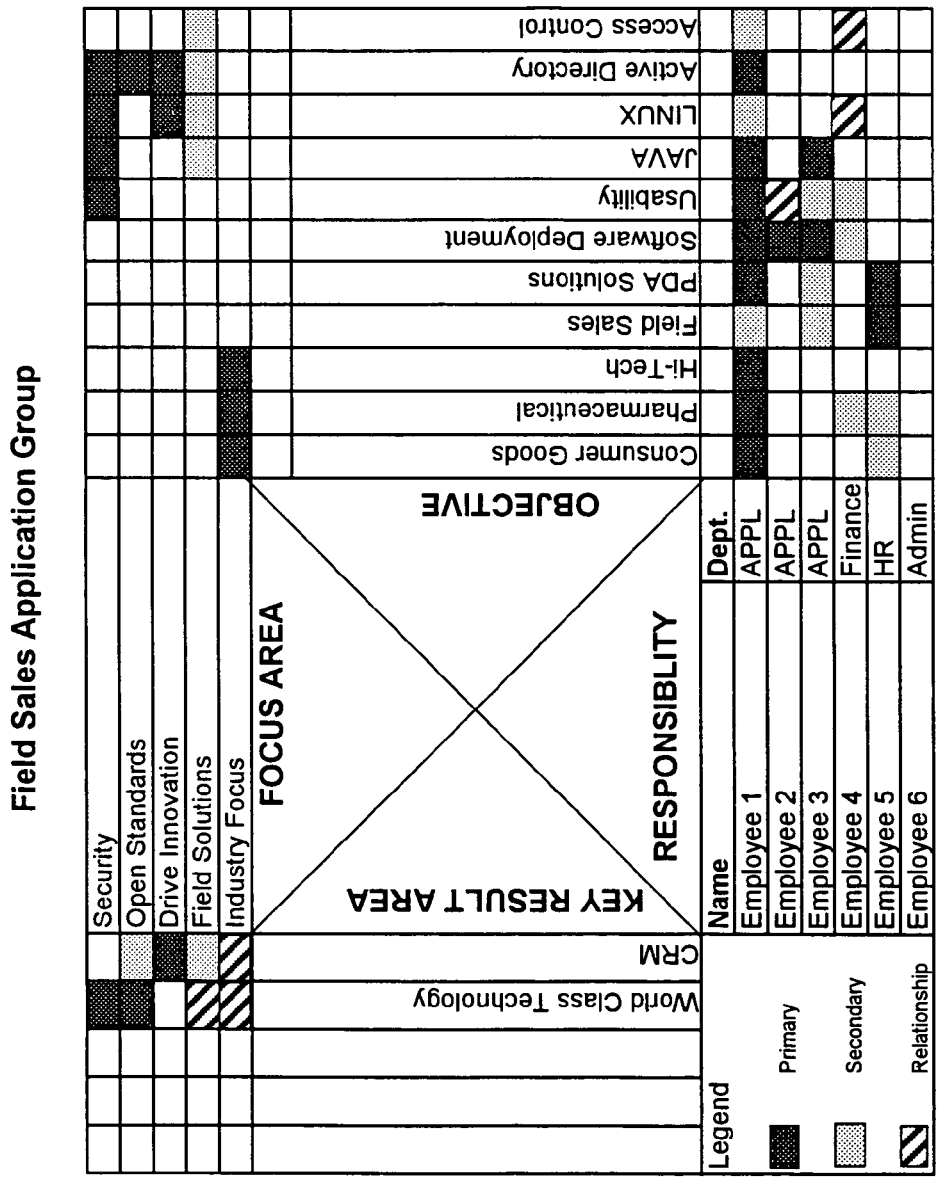
FIG. 5 depicts a human resources application of the diagrams of FIGS. 3 and 4.

In FIG. 2, lines represented the relationships and break down among descriptors. In FIG. 3, the same relationships and breakdowns are represented by relationship grids. An example of a relationship grid is shown in FIG. 5. While the relationship grid of FIG. 5 is a three-by-three grid, other size grids are appropriate depending on the size of the descriptor lists. In FIG. 3, there are three relationship grids —a first relationship grid with six rows and three columns at the top left corner of FIG. 3, a second relationship grid with six rows and seven columns at the top right corner of FIG. 3, and a third relationship grid with three rows and seven columns at the bottom right corner of FIG. 3. In this manner, the first relationship grid is adjacent to the first relationship list containing KRA1, KRA2, and KRA3. The first relationship grid is also adjacent to the second descriptor list containing A1, A2, A3, A4, A5, and A6. The number of descriptors in the two descriptor lists adjacent to the relationship grid determine the size of the grid. Since the first descriptor list has three descriptors and the second descriptor list has six descriptors, the relationship grid that lies between these two descriptor lists has a dimension of six rows by three columns.

The first relationship grid defines the relationship between the descriptors of the first level hierarchy (KRA1, KRA2, and KRA3) and the descriptors of the second level hierarchy (A1, A2, A3, A4, A5, and A6). In this case, the relationship is a weighted one with three different weights (W1, W2, and W3) depicted. W1 is the highest importance or significance weight, W2 is the intermediate importance or significance weight, and W3 is the lowest importance or significance weight. The relationship grid thus depicts the importance or significance of the relationship between the first level descriptors, in this case, the Key Result Area descriptors, and the second level descriptors, the Focus Area descriptors.

In FIG. 3, KRA1 is related to A1, A2, A3, and A4. A2 and A3 have the highest importance relationship with KRA1 as depicted by the weight W1. A1 has an intermediate importance relationship with KRA1 as depicted by the weight W2. A4 has a lowest importance relationship with KRA1 as depicted by the weight W3. A5 and A6 have no relationship with KRA1 as depicted by the blank box in the first relationship grid. Similarly, KRA2 is related to A1, A2, A5, and A6. A5 has the highest importance relationship with KRA2 as depicted by the weight W1. A2 has an intermediate importance relationship with KRA2 as depicted by the weight W2. A1 and A6 have a lowest importance relationship with KRA2 as depicted by the weight W3. A3 and A4 have no relationship with KRA2 as depicted by the blank box in the first relationship grid. Finally, KRA3 is related to A3, A4, A5, and A6. No second level descriptors have a highest importance relationship with KRA3. A3 and A5 have an intermediate importance relationship with KRA3 as depicted by the weight W2. A4 and A6 have a lowest importance relationship with KRA3 as depicted by the weight W3. A1 and A2 have no relationship with KRA3 as depicted by the blank box in the first relationship grid. Most of the same relationships, absent the weights, are depicted in FIG. 2. However, the graphical depiction of FIG. 3 is more robust and compact than that of FIG. 2.

The first relationship grid also depicts how the first level descriptors break down into the second level descriptors. As shown, KRA1 breaks down into A1, A2, A3, and A4, KRA2 breaks down into A1, A2, A5, and A6, and KRA3 breaks down into A3, A4, A5, and A6. Most of the same break down relationship is shown in FIG. 2.

The second relationship grid, a grid with six rows and seven columns in the upper right hand corner of FIG. 3, displays the relationships and break down between the second level descriptors (A1, A2, A3, A4, A5, and A6) and the third level descriptors (O1, O2, O3, O4, O5, O6, and O7). In this example, second level descriptor A1 breaks down into third level descriptors O1, O2, O3, O4, and O5. Second level descriptor A2 breaks down into third level descriptors O1, O2, O6, and O7. Second level descriptor A3 breaks down into third level descriptors O1 and O2. Second level descriptor A4 breaks down into third level descriptors O1, O4, O5, and O6. Second level descriptor A5 breaks down into third level descriptors O3, O4, O5, O6, and O7. Second level descriptor A6 breaks down into third level descriptors O2 and O3.

The second relationship grid also displays the significance or importance of the relationships between the second level descriptors and the third level descriptors. A1 is related to O1, O2, O3, O4, and O5. O2, O3, and O4 have the highest importance relationship with A1 as depicted by the weight W1. O5 has an intermediate importance relationship with A1 as depicted by the weight W2. O1 has a lowest importance relationship with A1 as depicted by the weight W3. O6 and O7 have no relationship with A1 as depicted by the blank box in the second relationship grid. The relationships between the remaining second level descriptors and the third level descriptors can be ascertained in a similar manner.

The third relationship grid, a grid with three rows and seven columns in the lower right hand corner of FIG. 3, displays the dependency relationships and break down between the third level descriptors (O1, O2, O3, O4, O5, O6, and O7) and the fourth level descriptors (EMP1, EMP2, and EMP3). In this example, third level descriptor O1 breaks down into fourth level descriptors EMP1 and EMP2. Third level descriptor O2 breaks down into fourth level descriptors EMP1 and EMP2. Third level descriptor O3 breaks down into fourth level descriptors EMP1 and EMP3. Third level descriptor O4 breaks down into fourth level descriptors EMP1 and EMP3. Third level descriptor O5 breaks down into fourth level descriptors EMP1 and EMP3. Third level descriptor O6 breaks down into fourth level descriptors EMP2 and EMP3. Third level descriptor O7 breaks down into fourth level descriptors EMP2 and EMP3.

In this case, in addition to displaying the significance or importance of the relationships between the third and fourth level descriptors, the third relationship grid also displays dependencies among fourth level descriptors. As mentioned, the fourth level descriptors represent three different employees (EMP1, EMP2, and EMP3). Two weights denoted by "P" and "S" describe whether the particular Objective is a primary ("P") or secondary ("S") responsibility of the employees. For example, Objective 2 (O2) is a primary responsibility of Employee 2 (EMP2) and a secondary responsibility of Employee 1 (EMP1). In this manner, the tasks that correspond to a particular objective can be assigned to a particular employee, or the objective itself can be assigned, as depicted here. Similarly, Objective 3 (O3) is a primary responsibility of Employee 1 (EMP1) and a secondary responsibility of Employee 3 (EMP3). Objective 4 (O4) is a primary responsibility of Employee 3 (EMP3) and a secondary responsibility of Employee 1 (EMP1). Objective 6 (O6) is a primary responsibility of Employee 3 (EMP3) and a secondary responsibility of Employee 2 (EMP2). Finally, Objective 7 (O7) is a primary responsibility of Employee 3 (EMP3) and a secondary responsibility of Employee 2 (EMP2).

The third relationship grid also displays dependencies between descriptors belonging to the same level or hierarchy. In this case, the diagram depicts two dependencies, each denoted by "D." These dependencies are between two different employees—i.e. two different descriptors in the same level. Employee 1 (EMP1) has primary responsibility for Objective 1 (O1). However, Employee 1 (EMP 1) has a dependency, denoted by "D," on Employee 2 (EMP2) for Objective 1 (O1). In this case, Employee 2 may have information that Employee 1 needs to accomplish Objective 1, thus creating the dependency displayed in FIG. 3. A dependency may exist when one employee must rely on another employee for the completion of the particular objective. For example, Employee 3 (EMP3) has primary responsibility for Objective 5 (O5). However, Employee 3 (EMP3) has a dependency on Employee 1 (EMP1) for Objective 5 (O5). In this case, Employee 3 needs to rely on Employee 1 in order to complete Objective 5.

The diagram of FIG. 3 can be traveled in a clockwise direction to determine break down, dependency, and relationship information for descriptors. For example, KRA3 is related to A3, A4, A5, and A6 in that A3 and A5 have an intermediate importance relationship with KRA3 as depicted by the weight W2, and A4 and A6 have a lowest importance relationship with KRA3 as depicted by the weight W3. Mathematically, $KRA3=W2A3+W3A4+W2A5+W3A6$. Likewise, A3 is related to O1 and O2 in that both O1 and O2 have an intermediate importance relationship with A3 as depicted by the weight W2. Mathematically, $A3=W2O1+W2O2$. Therefore, KRA3 is related to O1 and O2 through A3 (and similarly through A4 and A6). In the case of the relationship through A3, KRA3 can be expressed as: $KRA3=W2(W2O1+W2O2)+W3A4+W2A5+W3A6$. In a similar manner, KRA3 or any other higher level descriptor can be expressed as a function of lower level descriptors.

Instead of a mathematical relationship, traversing the diagram in a clockwise direction can yield qualitative relationships between lower level descriptors and higher level descriptors. For example, KRA1 has a highest importance (W1) relationship with A2 and A3. A2 has a highest importance relationship with O1 and O7. Therefore, it is appropriate to conclude that Objectives 1 and 7 are qualitatively important to Key Result Area 1. Other similar qualitative relationships can be easily ascertained in a similar manner.

Likewise, the diagram of FIG. 3 can be traversed in a counterclockwise direction to determine similar qualitative and quantitative relationships. For example, an employee may come up with a new objective that does not appear on the diagram. That objective can be grouped with the third level of descriptors (the other objectives). Working in a counterclockwise direction, the importance or significance of the new objective to the six Focus Areas (the second level descriptors) can be determined. These weights can be entered into a new column (not shown) of the second relationship grid. In this manner, the relationship that a new objective shares with the higher level descriptors (the Focus Area descriptors and the Key Result Area descriptors) can be ascertained.

Figure 4:
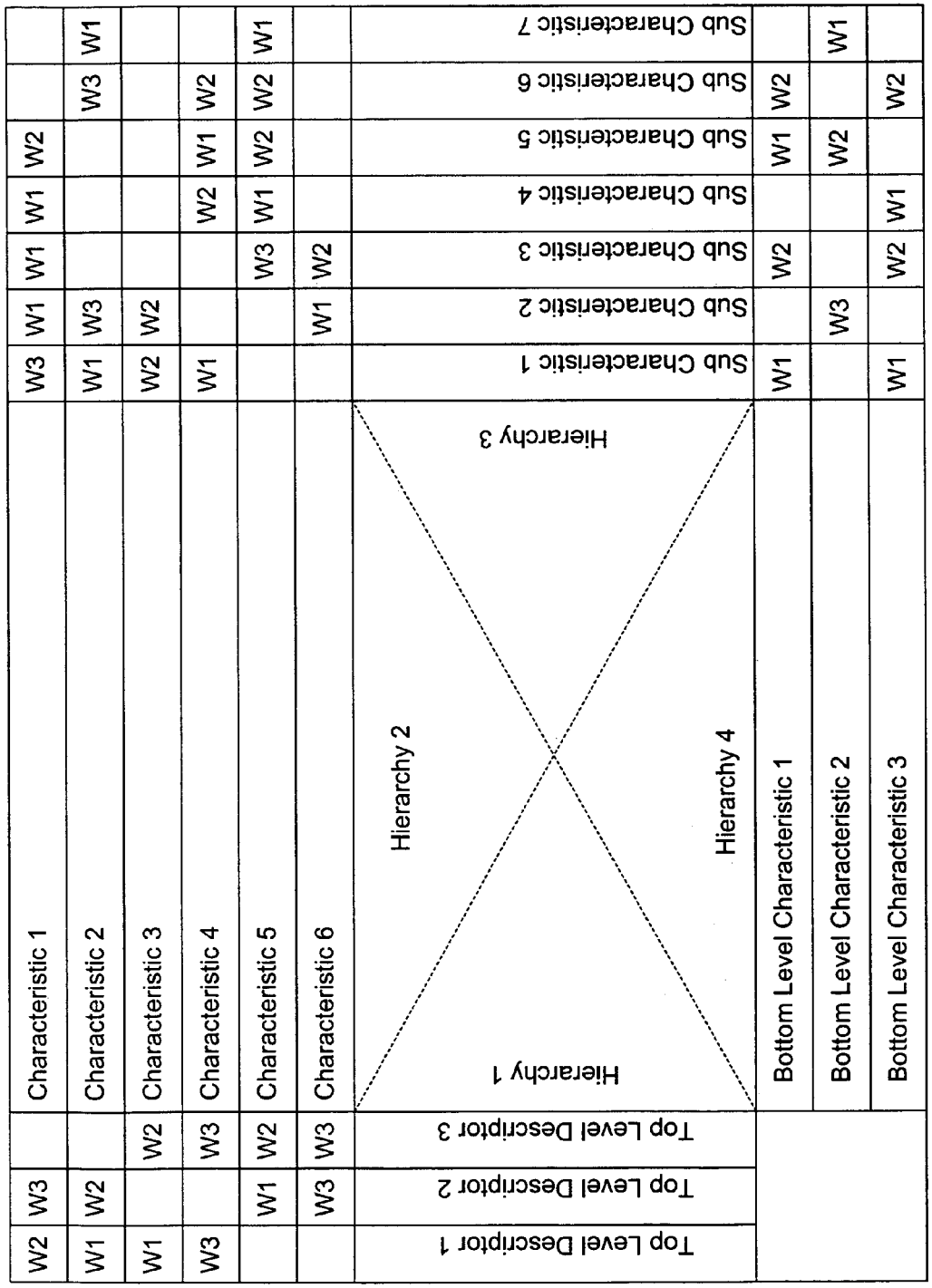
FIG. 4 depicts the same diagram of FIG. 3 with different relationships among different descriptors.

FIG. 4 depicts the same diagram of FIG. 3 with different relationships among different descriptors. In this diagram, hierarchy 1 includes three top level descriptors. Hierarchy 2 includes six different characteristics of the top level descriptors. Hierarchy 3 contains seven sub-characteristics of the top level descriptors. Hierarchy 4 contains three bottom level characteristics of top level descriptor. In this manner, the characteristics of the top level descriptors can be refined and grouped into lower level hierarchies. Any number of groups of different gradations of characteristics can be formed and relationships between them can be developed. In FIG. 4, top level descriptor has three different gradations of characteristics. Adjacent hierarchies, in this case, have weighted relationships.

FIG. 5 is a human resources application of the diagrams of FIGS. 3 and 4. In FIG. 5, two Key Result Areas, world class technology and customer relationship management (CRM), are included in the first level of the hierarchy. In this case, the Key Result Areas represent broad concepts that act as overarching themes for the direction of a corporation. The corporation and its field sales application group look to these key result areas as goals. In this case, the corporation and its employees strive to create world class technology and superior CRM (the two Key Result Areas). Five Focus Areas, security, open standards, drive innovation, field solutions, and industry focus, are included in the second level of the hierarchy. These Focus Areas represent general areas of endeavor or general types of projects. For example, security is a general area that encompasses software security projects. Eleven Objectives (Consumer Goods, Pharmaceuticals, Hi-Tech, Field Sales, PDA Solutions, Software Deployment, Usability, JAVA, LINUX, Active Directory, and Access Control) are included in the third level of the hierarchy. Each of these Objectives represent task-related goals that are assigned to individual employees. Six employees are included in the fourth level hierarchy.

Just as in FIGS. 3 and 4, relationships exist between adjacent hierarchies. In this case, the three types of relationships are primary, secondary and supporting. A primary relationship is one that indicates a primary responsibility or high priority relationship between two descriptors. A secondary relationship is one that indicates a secondary responsibility or low priority relationship between two descriptors. A supporting relationship is one that indicates a supporting role with no direct responsibility.

In FIG. 5, the Key Result Area CRM has a primary relationship with the Focus Area Drive Innovation, a secondary relationship with Open Standards and Field Solutions, a supporting relationship with Industry Focus, and no relationship with Security. In this manner, Drive Innovation and CRM have a high priority relationship and are closely related to each other. Open Standards and CRM have a low priority relationship and are less closely related to each other. Industry Focus provides support for CRM but is not directly related. Similar relationships can be derived between World Class Technology and the five Focus Areas.

The Focus Areas are related to the Objectives in a similar fashion. The Objective JAVA is primarily related to the Focus Area Security and secondarily related to Field Solutions. In this manner, the individual tasks associated with JAVA have a significant relationship or impact on the projects or goals related to software security. Likewise, the JAVA tasks have a less significant relationship with the Field Solutions goals. Similar relationships are depicted between the other Objectives and Focus Areas.

FIG. 5 also depicts the responsibilities assigned to individual employees. Six employees (Employee 1 through Employee 6) are each assigned responsibility for various Objectives. As explained above, employees are assigned primary, secondary, or supporting responsibility for an objective. In this case, Employee 1 is primarily responsible for the tasks related to Usability. Employee 3 and Employee 4 are secondarily responsible for Usability tasks. In this manner, Employee 3 and Employee 4 may report to Employee 1 for Usability tasks, or they may have responsibility for various subtasks associated with Usability. Employee 2 has a supporting relationship for Usability tasks. In this manner, Employee 2 plays a supporting role in achieving the Usability Objective. Employee 2 may report to Employee 1, Employee 3, and Employee 4 or may simply have information or expertise that is necessary for the other employees to complete the Usability Objective.

FIG. 5, like FIGS. 3 and 4, can be traversed in a clockwise or counterclockwise direction to yield qualitative and quantitative information about the relationships between adjacent hierarchies. FIG. 5, like FIGS. 3 and 4, can be used to manage a project, establish and change the assignment of tasks to employees, and establish and change objectives and goals. For example, employees, objectives, focus areas, and key result areas can be added or changed to create new relationships during the course of a project. In this manner one or more diagrams, like FIG. 5, can be used to track, monitor, and manage a project. FIG. 5 can be used to monitor the progress of employees as they complete objectives and to manage employees during one or more ongoing projects.

Figure 8:
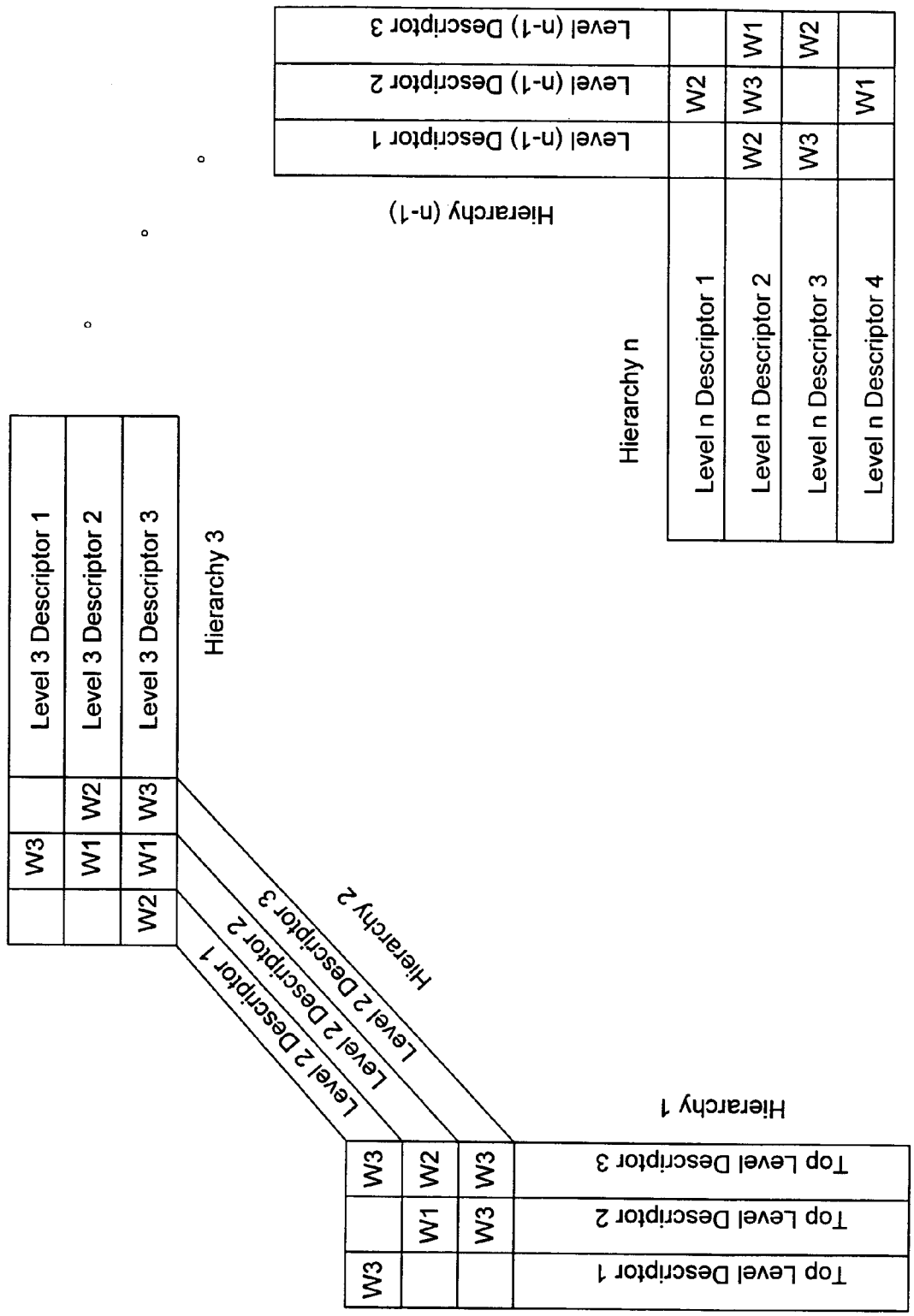
FIG. 8 is multi-dimensional graphical display depicting (n−1) different relationships among n different groups of descriptors.

FIG. 6 is an example of a relationship grid that forms a building block for the graphical display diagram of FIG. 8. While the relationship grid of FIG. 6 is a three by three grid, any number of rows and columns may be used. Further, the relationship grid of FIG. 6 depicts a weighted relationship. Any number of quantitative or qualitative relationships, such as dependency relationships, can be depicted with similar relationship grids.

FIG. 7 is an example of a descriptor list that forms a building block for the graphical display diagram of FIG. 8. While the descriptor list of FIG. 7 contains three descriptors, any number of descriptors can be included. The number of rows in the descriptor list is generally the same as the number of descriptors contained in the descriptor list.

FIG. 8 is multi-dimensional graphical display depicting (n−1) different relationships among n different groups of descriptors. The n groups of descriptors are displayed on n different descriptor lists. The (n−1) different sets of relationships are displayed on (n−1) different relationship grids. Each of the (n−1) different relationship grids is adjacent to two descriptor lists. For example, a first relationship grid is adjacent to the descriptor list containing the top level descriptors and the descriptor list containing the level 2 descriptors. A second relationship grid is adjacent to the descriptor list containing the level 2 descriptors and the descriptor list containing the level 3 descriptors. The (n−1)th relationship grid is adjacent to the descriptor list containing the level (n−1) descriptors and the descriptor list containing the level n descriptors.

In this manner, the relationships between numerous groups of descriptors can be displayed on a single multi-sided figure. While the graphical display in FIG. 8 is a rectilinear polygon, any figure, such as a curvilinear figure may be employed. The graphical display can be contained on a single piece of paper or on a computer display. For example, the relationships and dependencies among numerous different groups of descriptors can be depicted in a single graphical display that fits in a concise area.

While three weights are shown in FIGS. 3, 4, 5, 7 and 8, any number of quantitative or qualitative weights may be employed. For example, numerical weights from one to ten may be used as may more subjective weights such as "important" and "not important." Likewise, any number of dependencies and sub-dependencies may be used in the relationship grids. Dependency variables, like weights, can indicate a dependency relationship between adjacent hierarchies of descriptors. For example, a dependency variable may indicate that Objective 4 (O4) must be completed before Focus Area 5 (A5) can be assessed. Dependency variables can also indicate a dependency relationship between descriptors in the same hierarchy. For example, a dependency variable can indicate that Employee 1 (EMP1) who has primary responsibility for Objective 1 (O1) needs to rely on Employee 2 (EMP2) for information related to the completion of Objective 1.

FIGS. 9-12 are flowcharts providing more detail about the processes, which the system described above, or other systems, can carry out. Those skilled in the art will appreciate that the process flows may be implemented in a variety of fashions. Although these flowcharts illustrate most features of the processes, they may, for purposes of clarity, omit some features in the following text.

Figure 9:
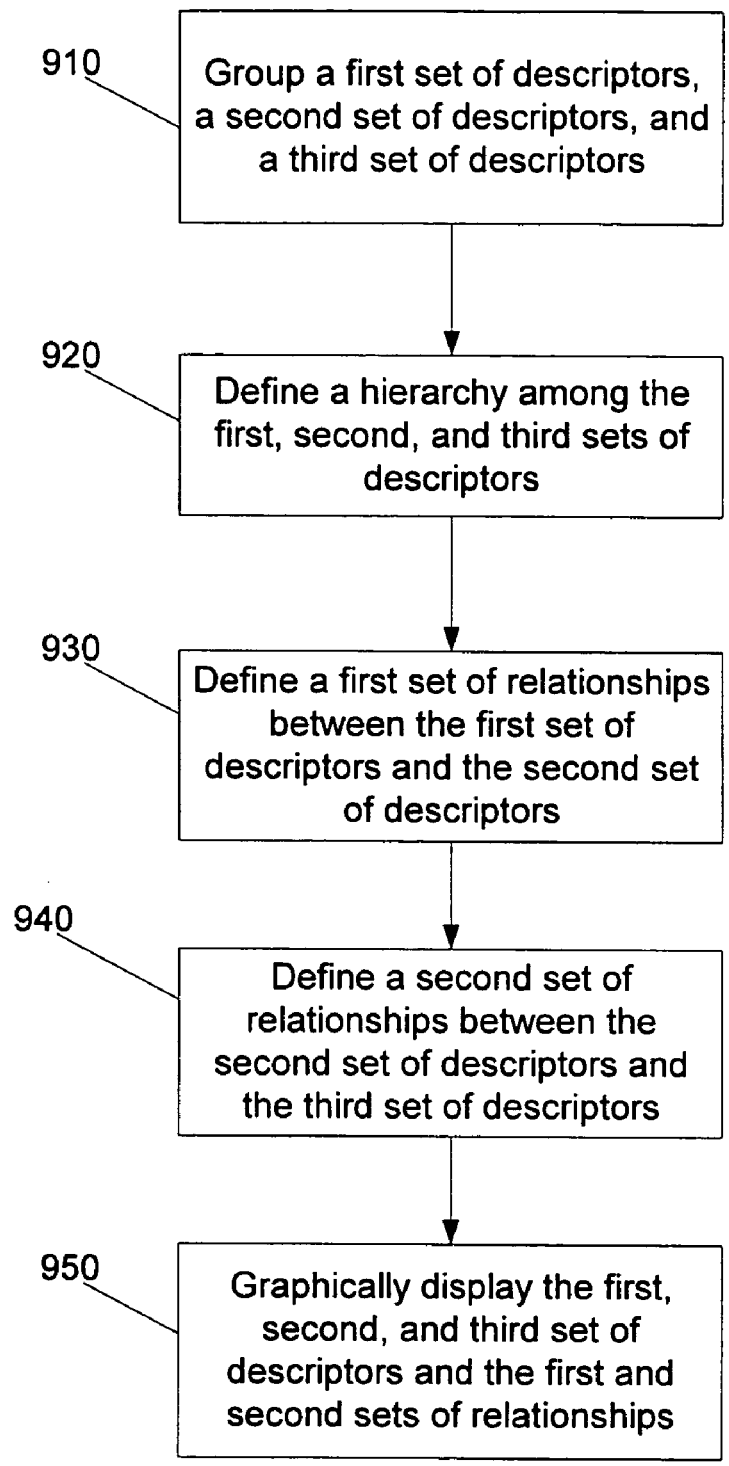
FIG. 9 is a flow chart of a method for graphically displaying relationships among different groups of descriptors.

FIG. 9 is a flow chart of a method of graphically displaying relationships among different groups of descriptors. In stage 910, the descriptors are grouped into three different sets. Each of the three sets of descriptors are assigned a hierarchy in stage 920. For example, the first set of descriptors may be placed in the highest level of the hierarchy, the second set of descriptors in the second level of the hierarchy, and the third set of descriptors in the third level of the hierarchy. Each set of descriptors can be displayed on a different descriptor list. In stage 930, relationships are defined between the first set of descriptors and the second set of descriptors. These relationships can be displayed in a relationship grid. In stage 940, relationships are defined between the second set of descriptors and the third set of descriptors. These relationships can also be displayed in another relationship grid. Finally, in stage 950, the three sets of descriptors and the two sets of relationships are graphically displayed. The three descriptor lists and two relationship grids can be displayed together to form a contiguous figure.

Figure 10:
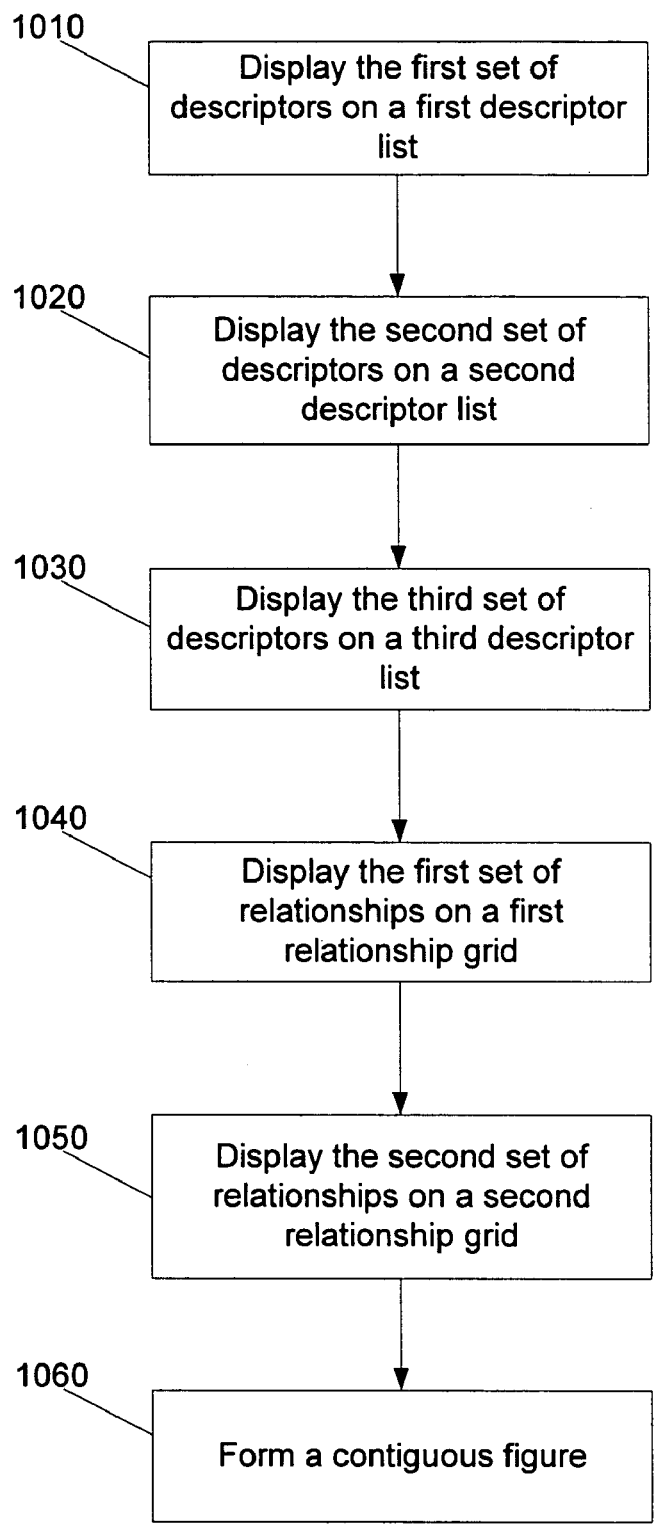
FIG. 10 is a flow chart of a method for graphically displaying relationships among different groups of descriptors.

FIG. 10 is a flow chart of a method for graphically displaying relationships among different groups of descriptors. In stage 1010, the first set of descriptors is displayed in a first descriptor list. In stage 1020, the second set of descriptors is displayed in a second descriptor list. In stage 1030, the third set of descriptors is displayed in a third descriptor list. In stage 1040, the first set of relationships is displayed in a first relationship grid. In stage 1050, the second set of relationships is displayed in a second relationship grid. Finally, in stage 1060, a contiguous figure is formed from the three descriptor lists and the two relationship grids.

Figure 11A:
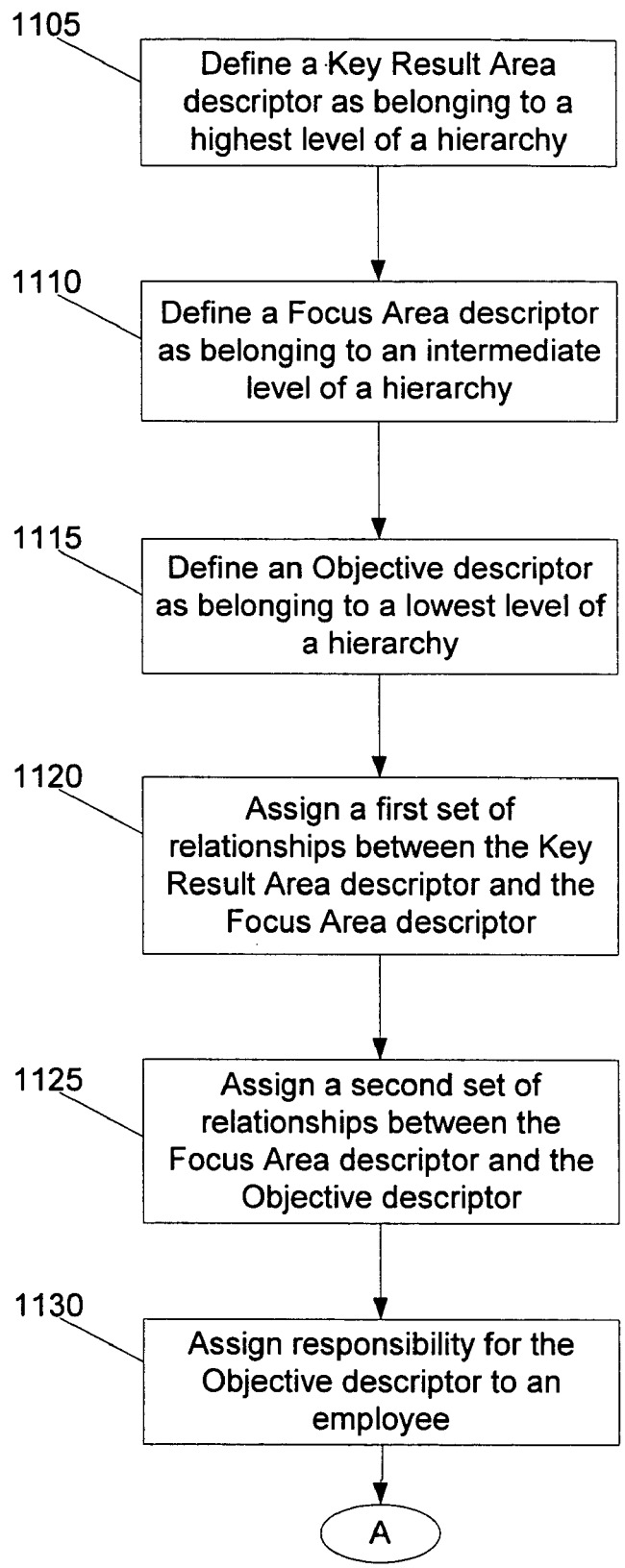
FIGS. 11A and 11B are a flow chart of a method for graphically displaying relationships among different groups of business descriptors.
Figure 11B:
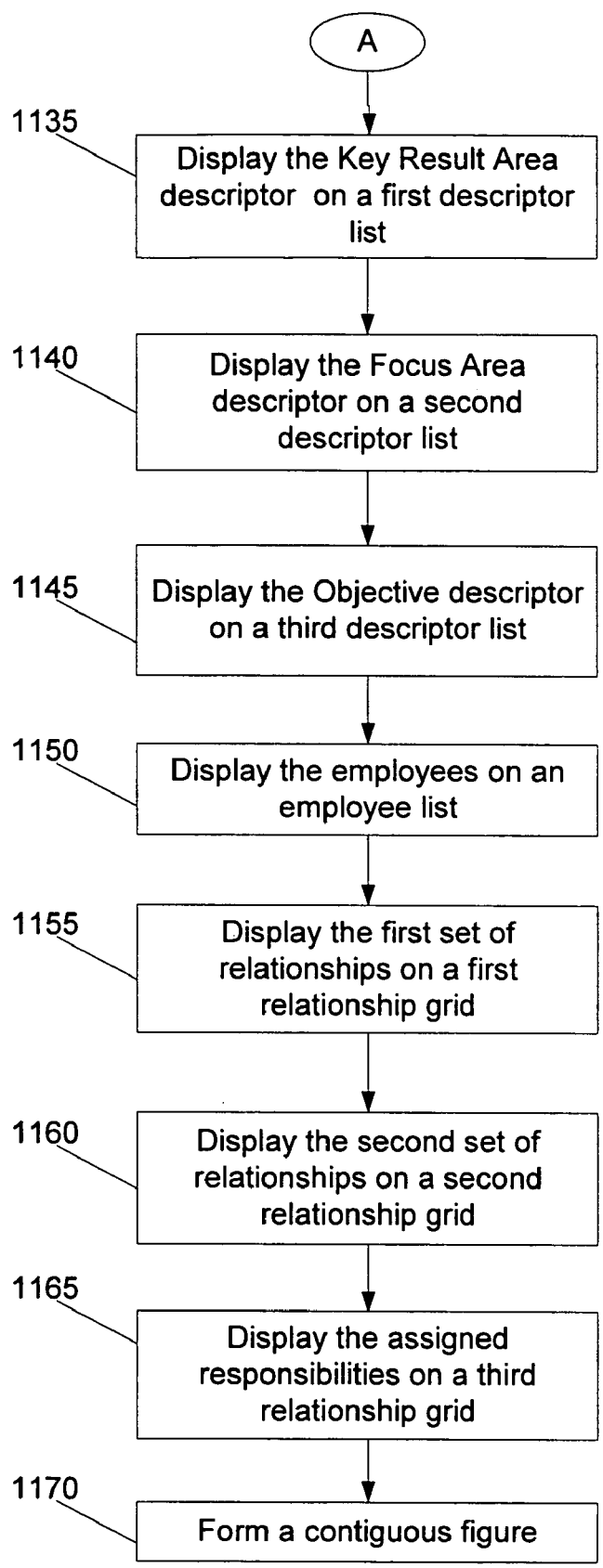

FIGS. 11A and 11B are a flow chart of a method for graphically displaying relationships among different groups of business descriptors. In stages 1105, 1110, and 1115, a Key Result Area descriptor is placed in the highest level of a hierarchy, a Focus Area descriptors placed in an intermediate level of a hierarchy, and an Objective descriptor is placed in the lowest level of a hierarchy. In stage 1120, a first set of relationships is assigned between the Key Result Area descriptor and the Focus Area descriptor. In stage 1125, a second set of relationships is assigned between the Focus Area descriptor and the Objective descriptor. In stage 1130, responsibility for an objective is assigned to an employee. In stages 1135, 1140, 1145 and 1150, the Key Result Area descriptor is displayed on a first descriptor list, the Focus Area descriptor is displayed on a second descriptor list, the Objective descriptor is displayed on a third descriptor list, and the employee is displayed on a fourth descriptor list. In stages 1155, 1160 and 1165, the first set of relationships are displayed on a first relationship grid, the second set of relationships are displayed on a second relationship grid, and the employee assignments are displayed on a third relationship grid. Finally, in stage 1170, a contiguous figure is formed from the four descriptor lists and the three relationship grids.

Figure 12:
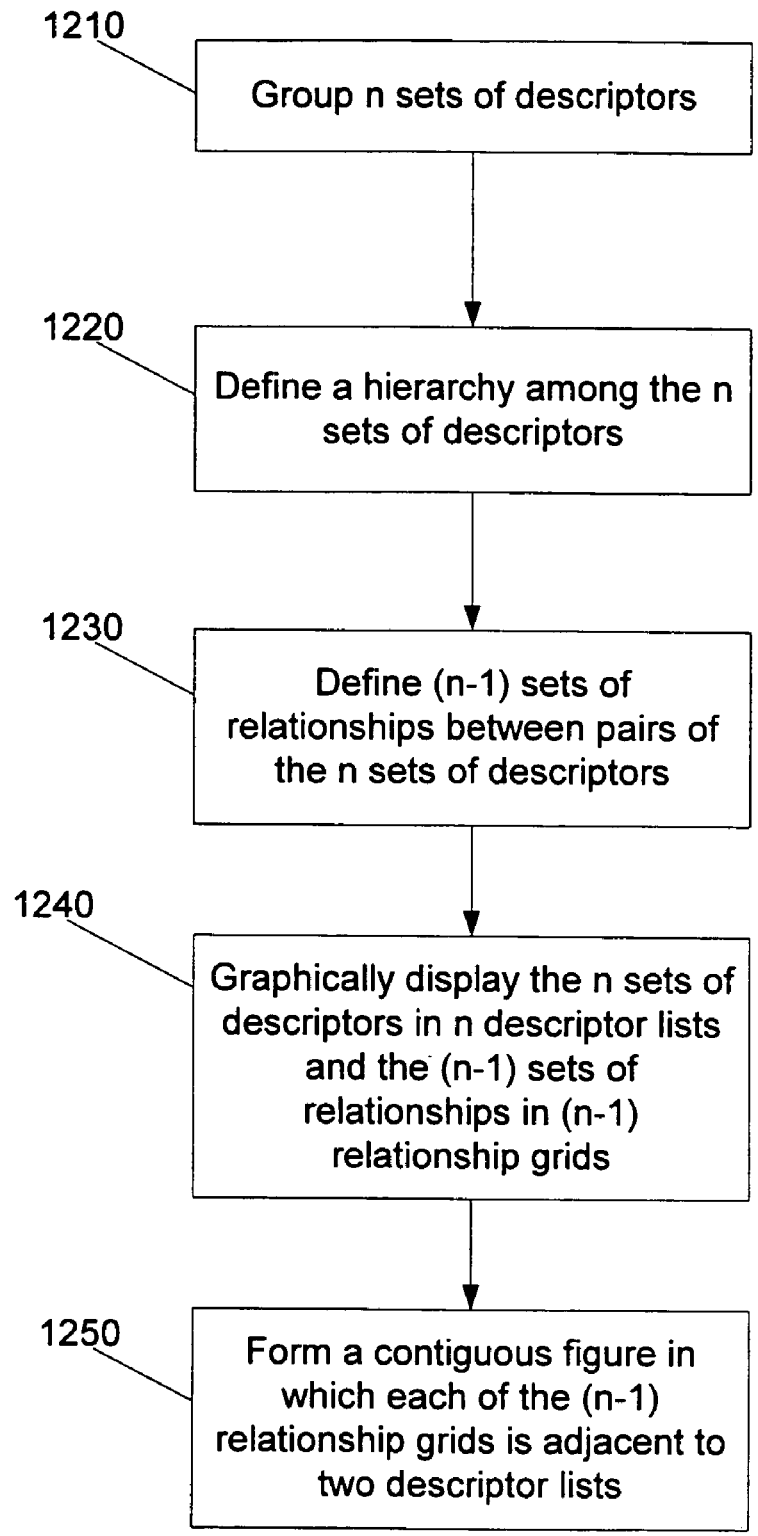
FIG. 12 is a flow chart of a method for graphically displaying relationships among n different groups of descriptors.

FIG. 12 is a flow chart of a method for graphically displaying relationships among n different groups of descriptors. In stage 1210, the descriptors are grouped into n sets. In stage 1220, the n sets of descriptors are placed into levels of a hierarchy. In stage 1230, (n−1) sets of relationships are defined between pairs of the n sets of descriptors. In stage 1240, the n sets of descriptors are graphically displayed as n descriptor lists and the (n−1) sets of relationships are graphically displayed as (n−1) relationship grids. Finally, in stage 1250, a contiguous figure is formed in which each of the (n−1) relationship grids is adjacent to two descriptor lists.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in may other ways, using equivalents and alternatives that do not depart from the scope of the following claims. Moreover, unless indicated to the contrary in the preceding description, none of the components described in the implementations is essential to the invention.

What is claimed is:

1. A method of describing relationships among a hierarchy of descriptors, comprising:
grouping a first set of descriptors, a second set of descriptors, and a third set of descriptors;
defining a hierarchy among the first, second, and third sets of descriptors;
defining a first set of relationships between the first set of descriptors and the second set of descriptors;
defining a second set of relationships between the second set of descriptors and the third set of descriptors; and
graphically displaying the first set of descriptors on a first descriptor list, the second set of descriptors on a second descriptor list, the third set of descriptors on a third descriptor list, the first set of relationships on a first relationship grid, and the second set of relationships on a second relationship grid;
wherein the first descriptor list is adjacent to the first relationship grid, the first relationship grid is adjacent to the second descriptor list the second descriptor list is adjacent to the second relationship grid, and the second relationship grid is adjacent to the third descriptor list thereby forming a contiguous figure;
wherein at least one of the relationship grids is positioned perpendicular to at least one of the other relationship grids.

2. The method of claim 1, further comprising:
grouping an $n^{th}$ set of descriptors, where $n \geq 4$;
defining the $n^{th}$ set of descriptors as belonging to an $n^{th}$ level of a hierarchy;
defining an $(n-1)^{th}$ set of relationships between the $n^{th}$ set of descriptors and an $(n-1)$ set of descriptors; and
graphically displaying the $n^{th}$ set of descriptors on an $n^{th}$ descriptor list the $(n-1)^{th}$ set of descriptors on an $(n-1)^{th}$ descriptor list and the $(n-1)^{th}$ set of relationships on a $(n-1)^{th}$ relationship grid;
wherein the $(n-1)^{th}$ descriptor list is adjacent to the $(n-1)^{th}$ relationship grid and the $(n-1)^{th}$ relationship grid is adjacent to the $n^{th}$ descriptor list.

3. The method of claim 1, wherein:
the second set of descriptors define characteristics of the first set of descriptors; and
the third set of descriptors define characteristics of the second set of descriptors.

4. The method of claim 1, wherein the first and second sets of relationships represent weights.

5. The method of claim 1, wherein the first and second sets of relationships represent dependencies.

6. The method of claim 1, further comprising:
ascertaining a characteristic of a descriptor in a lower hierarchy; and
ascertaining a characteristic of a descriptor in a higher hierarchy.

7. The method of claim 1, further comprising:
managing a project based on the descriptors and sets of relationships.

8. The method of claim 1, further comprising:
managing a group of employees based on the descriptors and sets of relationships.

9. A method of describing relationships among a hierarchy of business descriptors comprising:
defining a key result area descriptor as belonging to a highest level of a hierarchy;
defining a focus area descriptor as belonging to an intermediate level of a hierarchy;
defining an objective descriptor as belonging to a lowest level of a hierarchy;
assigning a first set of relationships between the key result area descriptor and the focus area descriptor;
assigning a second set of relationships between the focus area descriptor and the objective descriptor;
assigning responsibility for the objective descriptor to an employee; and
graphically displaying the key result area descriptor on a first descriptor list, the focus area descriptor on a second descriptor list, the objective descriptor on a third descriptor list, the employees on an employee list, the first set of relationships on a first relationship grid, the second set of relationships on a second relationship grid, and the assigned responsibilities on a third relationship grid;
wherein the first descriptor list is adjacent to the first relationship grid, the first relationship grid is adjacent to the second descriptor list, the second descriptor list is adjacent to the second relationship grid, the second reLationship grid is adjacent to the third descriptor list, the third descriptor list is adjacent to the third relationship grid, and the third relationship grid is adjacent to the employee list, thereby forming a contiguous figure.

10. The method of claim 9, wherein the first and second sets of relationships represent weights.

11. The method of claim 9, wherein the first and second sets of relationships represent dependencies.

12. The method of claim 9, further comprising:
ascertaining a characteristic of a descriptor in a lower hierarchy; and
ascertaining a characteristic of a descriptor in a higher hierarchy.

13. The method of claim 9, further comprising:
managing a project based on the descriptors and sets of relationships.

14. The method of claim 9, further comprising:
managing a group of employees based on the descriptors and sets of relationships.

15. A system for describing relationships among a hierarchy of descriptors, comprising:
a memory; and
a microprocessor coupled to the memory and programmed to;
receive a first set of descriptors, a second set of descriptors, and a third set of descriptors;
define a hierarchy among the first, second, and third sets of descriptors;
define a first set of relationships between the first set of descriptors and the second set of descriptors;
define a second set of relationships between the second set of descriptors and the third set of descriptors; and
graphically display the first set of descriptors on a first descriptor list, the second set of descriptors on a second descriptor list, the third set of descriptors on a third descriptor list, the first set of relationships on a first relationship grid, and the second set of relationships on a second relationship grid;
wherein the first descriptor list is adjacent to the first relationship grid, the first relationship grid is adjacent to the second descriptor list the second descriptor list is adjacent to the second relationship grid, and the second relationship grid is adjacent to the third descriptor list thereby forming a contiguous figure.

16. The system of claim 15, wherein the microprocessor is further programmed to:

receive a group of an $n^{th}$ set of descriptors, where $n \geq 4$;

define the $n^{th}$ set of descriptors as belonging to an $n^{th}$ hierarchy;

define an $(n-1)^{th}$ set of relationships between the nset of descriptors and an $(n-1)^{th}$ set of descriptors; and graphically display the nset of descriptors on an nth descriptor list the $(n-1)^{th}$ set of descriptors on an $(n-1)^{th}$ descriptor list, and the $(n-1)^{th}$ set of relationships on a relationship grid;

wherein the $(n-1)^{th}$ descriptor list is adjacent to the $(n-1)^{th}$ relationship grid and the $(n-1)^{th}$ relationship grid is adjacent to the nth descriptor list.

17. The system of claim 15, wherein the microprocessor is further programmed to:

return a characteristic of a descriptor in a lower hierarchy; and return a characteristic of a descriptor in a higher hierarchy.

18. The system of claim 15, wherein the first and second sets of relationships represent weights.

19. The system of claim 15, wherein the first and second sets of relationships represent dependencies.

20. The system of claim 15, wherein the microprocessor is further programmed to manage a project based on the descriptors and sets of relationships.

* * * * *